(12) United States Patent
Herbach et al.

(10) Patent No.: US 10,545,023 B1
(45) Date of Patent: Jan. 28, 2020

(54) SELECTING VEHICLE LOCATIONS (71) Applicant: Waymo LLC, Mountain View, CA (US)

(72) Inventors: Joshua Seth Herbach, San Francisco, CA (US); Nathaniel Fairfield, Mountain View, CA (US)

(73) Assignee: WAYMO LLC, Mountain View, CA (US)

( * ) Notice: Subject to any disclaimer, the term of this patent is extended or adjusted under 35 U.S.C. 154(b) by 666 days.

(21) Appl. No.: 14/948,754

(22) Filed: Nov. 23, 2015

(51) Int. Cl.
| | | |
|---|---|---|
| *G01C 21/34* | (2006.01) | |
| *G01C 21/36* | (2006.01) | |
| *B62D 15/02* | (2006.01) | |
| *G08G 1/00* | (2006.01) | |
| *G01C 21/28* | (2006.01) | |
| *G08G 1/0968* | (2006.01) | |
| *G06Q 50/30* | (2012.01) | |
| *G07B 13/06* | (2006.01) | |

(52) U.S. Cl.
CPC .......... *G01C 21/28* (2013.01); *G06Q 50/30* (2013.01); *G07B 13/06* (2013.01); *G08G 1/096833* (2013.01); *G08G 1/202* (2013.01)

(58) Field of Classification Search
None
See application file for complete search history.

(56) References Cited

U.S. PATENT DOCUMENTS

| | | | |
|---|---|---|---|
| 6,356,838 B1 | 3/2002 | Paul | |
| 10,071,745 B2* | 9/2018 | Sato | .............. B60W 30/14 |
| 2012/0041675 A1 | 2/2012 | Juliver et al. | |
| 2013/0345975 A1* | 12/2013 | Vulcano | ............ G01C 21/3632 |
| | | | 701/533 |
| 2014/0067490 A1 | 3/2014 | James et al. | |
| 2015/0219464 A1* | 8/2015 | Beaurepaire | ....... G01C 21/3438 |
| | | | 701/538 |
| 2015/0241241 A1* | 8/2015 | Cudak | .................. B62D 15/027 |
| | | | 701/408 |
| 2016/0267794 A1* | 9/2016 | Cogill | .................... G08G 1/143 |

* cited by examiner

*Primary Examiner* — Hussein Elchanti
*Assistant Examiner* — Paul A Castro
(74) *Attorney, Agent, or Firm* — Botos Churchill IP Law LLP (57) ABSTRACT

Aspects of the disclosure relate to providing pickup or drop off locations for transport services. In one example relating to a pickup location, a preferred location is identified. A plurality of possible locations is determined based on the preferred location and a set of heuristics including identifying at least one point on an opposite side of a roadway as the preferred location. For each given possible location of the plurality of possible locations, a route between a current location of a vehicle and that given possible location is determined. For each given possible location of the plurality of possible locations a cost value for the determined route of that given possible location is determined. A possible location is selected based on the determined cost values and provided as a pickup or drop off location for a passenger or cargo.

20 Claims, 9 Drawing Sheets

SELECTING VEHICLE LOCATIONS

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

BRIEF SUMMARY

One aspect of the disclosure provides a method. The method includes identifying, by one or more computing devices having one or more processors, a preferred location; determining, by the one or more computing devices, a plurality of possible locations based on the preferred location and a set of heuristics including identifying at least one point on an opposite side of a roadway as the preferred location; determining for each given possible location of the plurality of possible locations, by the one or more computing devices, a route between a current location of a vehicle and that given possible location; determining for each given possible location of the plurality of possible locations, by the one or more computing devices, a cost value for the determined route of that given possible location; selecting a possible location, by the one or more computing devices, based on the determined cost values; and providing, by the one or more computing devices, the possible location as a pickup location for a passenger.

In one example, determining the plurality of possible locations further includes identifying at least one location that is within a predetermined distance of the preferred location. In another example, determining the plurality of possible locations further includes identifying at least one location using a pre-computed network of lane neighbors. In another example, the method also includes, prior to determining the determined routes, filtering the plurality of possible locations based on distances between possible locations of the plurality of possible locations. In another example, the method also includes, prior to determining the determined routes, filtering the plurality of possible locations based on a user preference for crossing a roadway. In another example, the method also includes, prior to determining the determined routes, filtering the plurality of possible locations based on where the point is located in a no parking zone. In another example, the method also includes, prior to determining the determined routes, filtering the plurality of possible locations based on where the point is located relative to a fire hydrant. In another example, the method also includes determining a cost value for a particular possible location is based on a spatial relationship between the particular possible location and a destination location for the vehicle after the passenger has been picked up. In another example, the method also includes determining a cost value for a particular possible location is based on whether the determined route for the particular possible location would require the vehicle to perform a U-turn.

Another aspect of the disclosure provides a system. The system includes one or more server computers each having one or more processors. The one or more server computers are configured to identify a preferred location; determine a plurality of possible locations based on the preferred location and a set of heuristics including identifying at least one point on an opposite side of a roadway as the preferred location; determine for each given possible location of the plurality of possible locations a route between a current location of a vehicle and that given possible location; determine for each given possible location of the plurality of possible locations a cost value for the determined route of that given possible location; select a possible location based on the determined cost values; and provide the possible location as a pickup location for a passenger.

In one example, the one or more computing devices are further configured to determine the plurality of possible locations further by identifying at least one location that is within a predetermined distance of the preferred location. In another example, the one or more computing devices are further configured to determine the plurality of possible locations further by identifying at least one location using a pre-computed network of lane neighbors. In another example, the one or more computing devices are further configured to, prior to determining the determined routes, filter the plurality of possible locations based on distances between possible locations of the plurality of possible locations. In another example, the one or more computing devices are further configured to, prior to determining the determined routes, filter the plurality of possible locations based on a user preference for crossing a roadway. In another example, the one or more computing devices are further configured to, prior to determining the determined routes, filter the plurality of possible locations based on where the point is located in a no parking zone. In another example, the one or more computing devices are further configured to, prior to determining the determined routes, filter the plurality of possible locations based on where the point is located relative to a fire hydrant. In another example, the one or more computing devices are further configured to determine a cost value for a particular possible location is based on a spatial relationship between the particular possible location and a destination location for the vehicle after the passenger has been picked up. In another example, the one or more computing devices are further configured to determine a cost value for a particular possible location is based on whether the determined route for the particular possible location would require the vehicle to perform a U-turn. In another example, the system further comprises the vehicle.

A further aspect of the disclosure provides a non-transitory, tangible, computer readable medium on which instructions are stored. The instructions, when executed by one or more processors, cause the one or more processors to perform a method. The method includes identifying a preferred location; determining a plurality of possible locations based on the preferred location and a set of heuristics including identifying at least one point on an opposite side of a roadway as the preferred location; determining for each given possible location of the plurality of possible locations a route between a current location of a vehicle and that given possible location; determining for each given possible location of the plurality of possible locations a cost value for the determined route of that given possible location; selecting a possible location based on the determined cost values; and providing the possible location as a pickup location for a passenger.

DETAILED DESCRIPTION

Overview

The technology relates to routing vehicles to locations in order to pick or drop off up passengers or cargo. Typically, a vehicle may be provided with a particular point for a pick up location. However, when considering the realities of maneuvering a vehicle such as an autonomous vehicle, such as the quirks of the geography of roads as well as traffic and other conditions, it can become very difficult to efficiently reach a specific location for a pick up or drop off of passengers or cargo. A common solution to this problem may be simply to stop the vehicle as close to the specific pick up location as possible. However, this can lead to some very inefficient results, such as driving around the block or making U-turns, etc. In order to address this, a plurality of possible locations may be analyzed to identify those which would be most efficient in terms of reaching a location in order to pick up or drop off a passenger or cargo.

In order to identify a plurality of possible locations, detailed map information describing the shape, lanes, orientations, and other characteristics of roadways must be available. In some instances, this detailed information may include a roadgraph having a precomputed index of "lane neighbors." For example, each lane identified in the detailed map information may be associated with information about any neighboring lanes in the roadgraph. With this information, for any given point in a lane, the detailed map information may be used to readily identify the neighboring lanes and the orientations of any such neighboring lanes. This also allows for traversing the detailed map information without having to do more expensive calculations to identify neighboring points.

In order to identify the plurality of possible locations, a preferred location must be identified. This information may be provided, for example, by a passenger who is requesting a pick up or drop off and forwarded directly to a vehicle for computing. Alternatively, the computing may be performed by a dispatching server computing system which acts as an intermediary between a passenger and the vehicle. In yet another alternative, a pickup or drop off location may be simply provided by the dispatching server computing system without initial input from a user.

The preferred location may then be used to identify a plurality of possible locations. For instance, a series of heuristics for discovering or selecting points of the predetermined locations where an autonomous vehicle can park, stop and wait, load and unload passengers, etc. may be used. These heuristics may include identifying one or more points on the opposite side of the street as the preferred location using the precomputed index of lane-neighbors. Another heuristic may include searching for points within the roadgraph that are close to or co-located with the preferred location. A further heuristic may include locating points that are within a predetermined, or in some cases user-specified, distance of the preferred location. As an example, a user may specify how far he or she is willing to walk. Thus, the plurality of possible locations may include the preferred location as well as any other point identified using any of the heuristics discussed above.

The identified plurality of possible locations may then be filtered. For example, in order to avoid having points that may appear to be very close to one another, but are in reality (or rather topographically) are so close as to be considered the same point, the points may be required to be at least some small distance, such as a few meters or more or less) from their closest neighbor point of the plurality of possible locations. In another example, user preferences may be used as a filter, such as where a user may not want to cross any streets. In other examples, "bad points" may be filtered using the detailed map information, such as where a point is in a no parking zone or would block a fire hydrant.

The remaining plurality of possible locations may then be analyzed to determine a cost for the vehicle to reach each of the possible locations from its current location. For instance, a cost for a given point may be determined from the distance or time of the route to that point. The cost may also include valuing the route based on its location relative to a particular destination or whether the reaching the point would require difficult maneuvers such as a U-turn.

Once the costs of such points have been identified, the lowest costing point or points may be provided to the user. In this regard, the user may be provided with a single point, a fixed number of points as possible locations or a user provided number of points. In this regard, points with higher costs may be excluded and the user may be provided with the best, lowest cost point or points.

The point or points may be provided to the user in various ways which may allow for further refinement. For instance, a map may be displayed with a map pin or other icon identifying each of the points. The user may then select one of the points or may adjust a point, such as by relocating a map pin. Once approved, the dispatching server computing system may dispatch the vehicle to the approved point.

The features discussed herein allow for significant flexibility in identifying pick up locations. As noted above, locations on the opposite side of a street may be used which could potentially allow a vehicle to reach a passenger faster. In addition, locations which may be less desirable, such as those that require crossing a street, may be avoided in some cases, but made available in other cases where they actually become more desirable.

Example Systems

Figure 1:
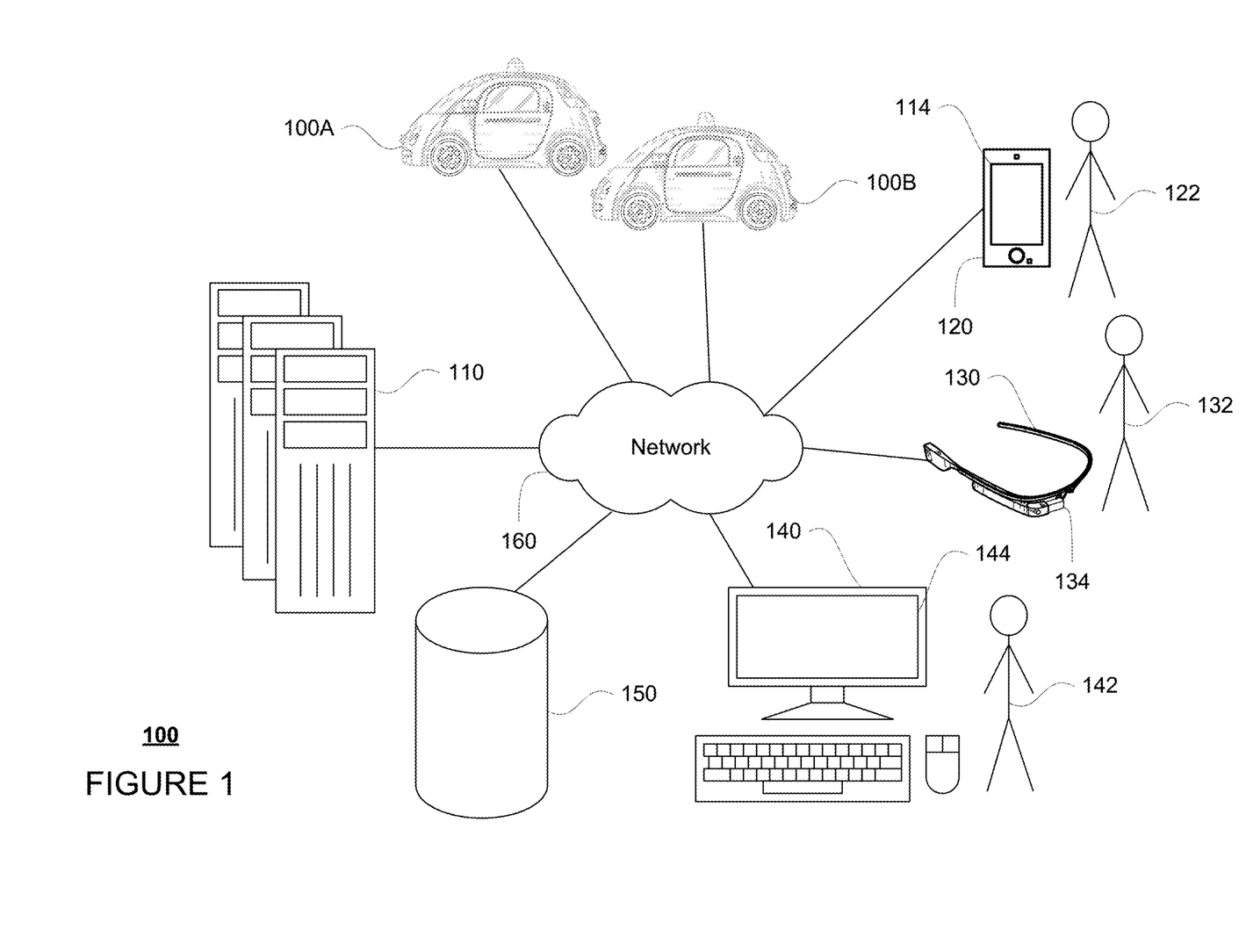
FIG. 1 is a functional diagram of an example system in accordance with an exemplary embodiment.
Figure 2:
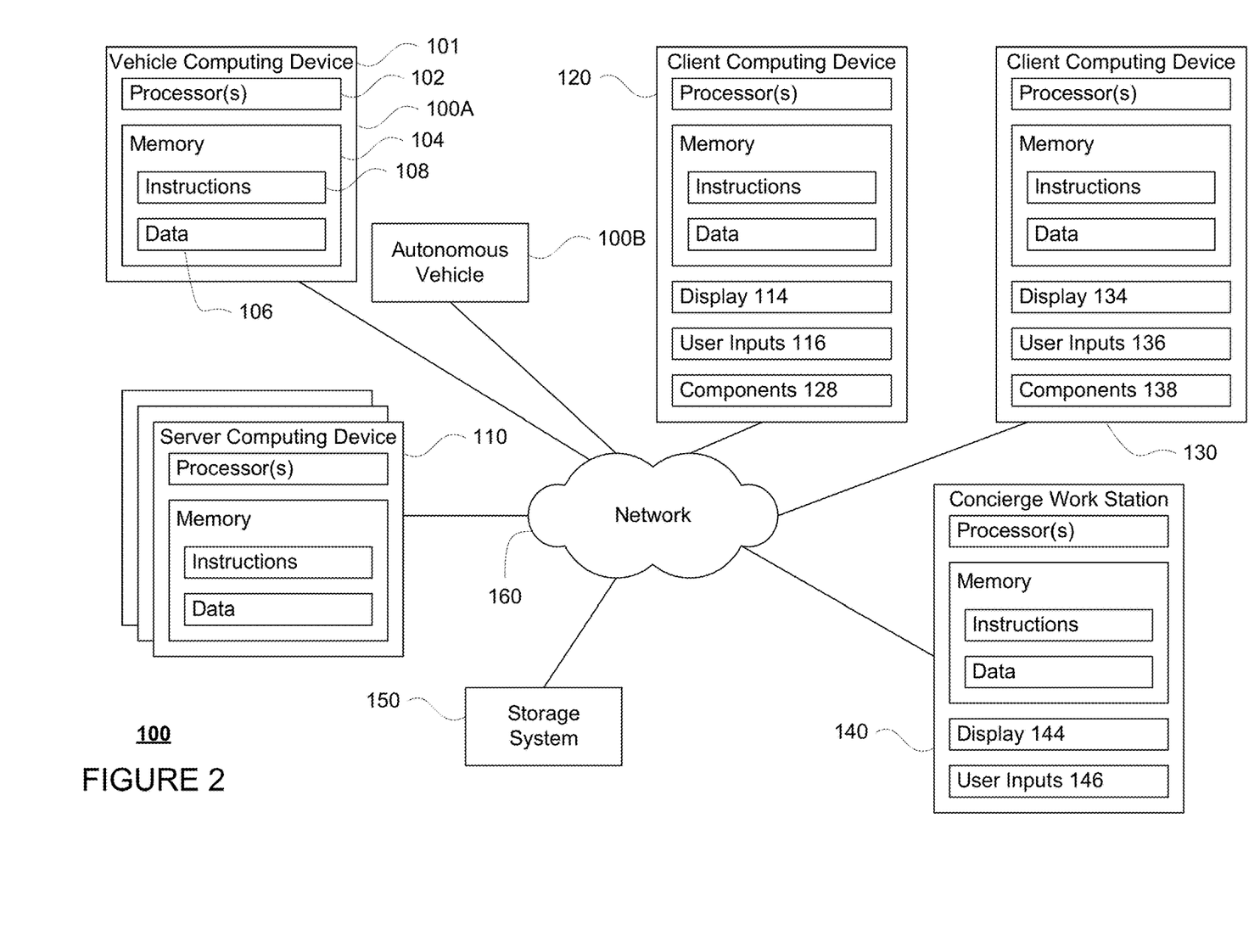
FIG. 2 is a pictorial diagram of the system of FIG. 1 in accordance with aspects of the disclosure.

As shown in FIGS. 1 and 2, a system 100 in accordance with one aspect of the disclosure includes various components such as vehicles 100A and 100B. While certain aspects of the disclosure are particularly useful in connection with specific types of vehicles, the vehicle may be any type of vehicle including, but not limited to, cars, trucks, motorcycles, busses, recreational vehicles, etc. The vehicles may have one or more computing devices, such as computing device 101 (shown in FIG. 2) containing one or more processors 102, memory 104, data 106, instructions 108 and other components typically present in vehicles having an autonomous driving mode. In this regard, computing device 101 may be an autonomous driving system that can control aspects of vehicle 100A in order to maneuver vehicle 100A for example, between pickup and destination locations. In addition vehicle 100B may be configured the same or similarly to vehicle 100A.

The memory 104 stores information accessible by the one or more processors 102, including instructions 108 and data 106 that may be executed or otherwise used by the processor 102. The memory 104 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 108 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 106 may be retrieved, stored or modified by processor 102 in accordance with the instructions 108. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 102 may be any conventional processors, such as commercially available CPUs. Alternatively, the one or more processors may be a dedicated device such as an ASIC or other hardware-based processor. Although FIG. 2 functionally illustrates the processor, memory, and other elements of the vehicle's computing device 101 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 101. Accordingly, references to a processor or computing device will be understood to include references to a collection of processors or computing devices or memories that may or may not operate in parallel.

Computing device 101 may include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). In this example, the vehicle includes an internal electronic display as well as one or more speakers to provide information or audio visual experiences. In this regard, an internal electronic display may be located within a cabin of vehicle 100A and may be used by computing device 101 to provide information to passengers within the vehicle 100A.

Computing device 101 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing device 101 of vehicle 100A may also receive or transfer information to and from other computing devices. In this regard, system 100 also includes a plurality of computing devices 110, 120, 130, 140 and a storage system 150 connected via a network 160. As noted above, system 100 also includes vehicle 100B, which may be configured similarly to vehicle 100. Although only a few vehicles and computing devices are depicted for simplicity, a typical system may include significantly more.

As shown in FIG. 2, each of computing devices 110, 120, 130, 140 may include one or more processors, memory, data and instructions. Such processors, memories, data and instructions may be configured similarly to one or more processors 102, memory 104, data 106, and instructions 108 of computing device 101.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more server computing devices 110 may include one or more server computing devices that are capable of communicating with computing device 101 of vehicle 100A or a similar computing device of vehicle 100B as well as computing devices 120, 130, 140 via the network 160. For example, vehicles 100A and 100B may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 110 may use network 160 to transmit and present information to a user, such as user 122, 132, 142 (shown in FIG. 1) on a display, such as displays 114, 134, 144 of computing devices 120, 130, 140. In this regard, computing devices 120, 130, 140 may be considered client computing devices.

As shown in FIG. 1, each client computing device 120, 130, 140 may be a personal computing device intended for use by a user 122, 132, 142, and have all of the components normally used in connection with a personal computing device including one or more processors (e.g., a central processing unit (CPU)), memory (e.g., RAM and internal hard drives) storing data and instructions, a display such as displays 114, 134, 144 (e.g., a monitor having a screen, a touch-screen, a projector, a television, or other device that is operable to display information), and user input devices 116, 136, 146 (e.g., a mouse, keyboard, touch-screen or microphone). The client computing devices may also include a camera for recording video streams, speakers, a network interface device, and all of the components used for connecting these elements to one another.

In addition, the client computing devices 120 and 130 may also include components 128 and 138 for determining the position and orientation of client computing devices. For example, these components may include a GPS receiver to determine the device's latitude, longitude and/or altitude as well as an accelerometer, gyroscope or another direction/speed detection device.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a head-mounted computing system in FIG. 1. As an example the user may input information using a small keyboard, a keypad, microphone, using visual signals with a camera, or a touch screen.

In some examples, client computing device 140 may be a concierge work station used by an administrator to provide concierge services to users such as users 122 and 132. For example, a concierge 142 may use the concierge work station 140 to communicate via a telephone call or audio connection with users through their respective client computing devices or vehicles 100A or 100B in order to facilitate the safe operation of vehicles 100A and 100B and the safety of the users as described in further detail below. Although only a single concierge work station 140 is shown in FIGS. 1 and 2, any number of such work stations may be included in a typical system.

Storage system 150 may store various types of information as described in more detail below. This information may be retrieved or otherwise accessed by a server computing device, such as one or more server computing devices 110, in order to perform some or all of the features described herein. For example, the information may include routing data for generating and evaluating routes between locations. For example, the routing information may be used to estimate how long it would take a vehicle at a first location to reach a second location. In this regard, the routing information may include map information including roads, as well as information about roads such as direction (one way, two way, etc.), orientation (North, South, etc.), speed limits, as well as traffic information identifying expected traffic conditions, etc. The map information may also include buildings, elevations, fire hydrants, construction zones, real time traffic conditions, etc. from various sources such as governmental institutions, paid informational services, manually entered information, information gathered and provided in real time by autonomous vehicles, etc.

Figure 3:
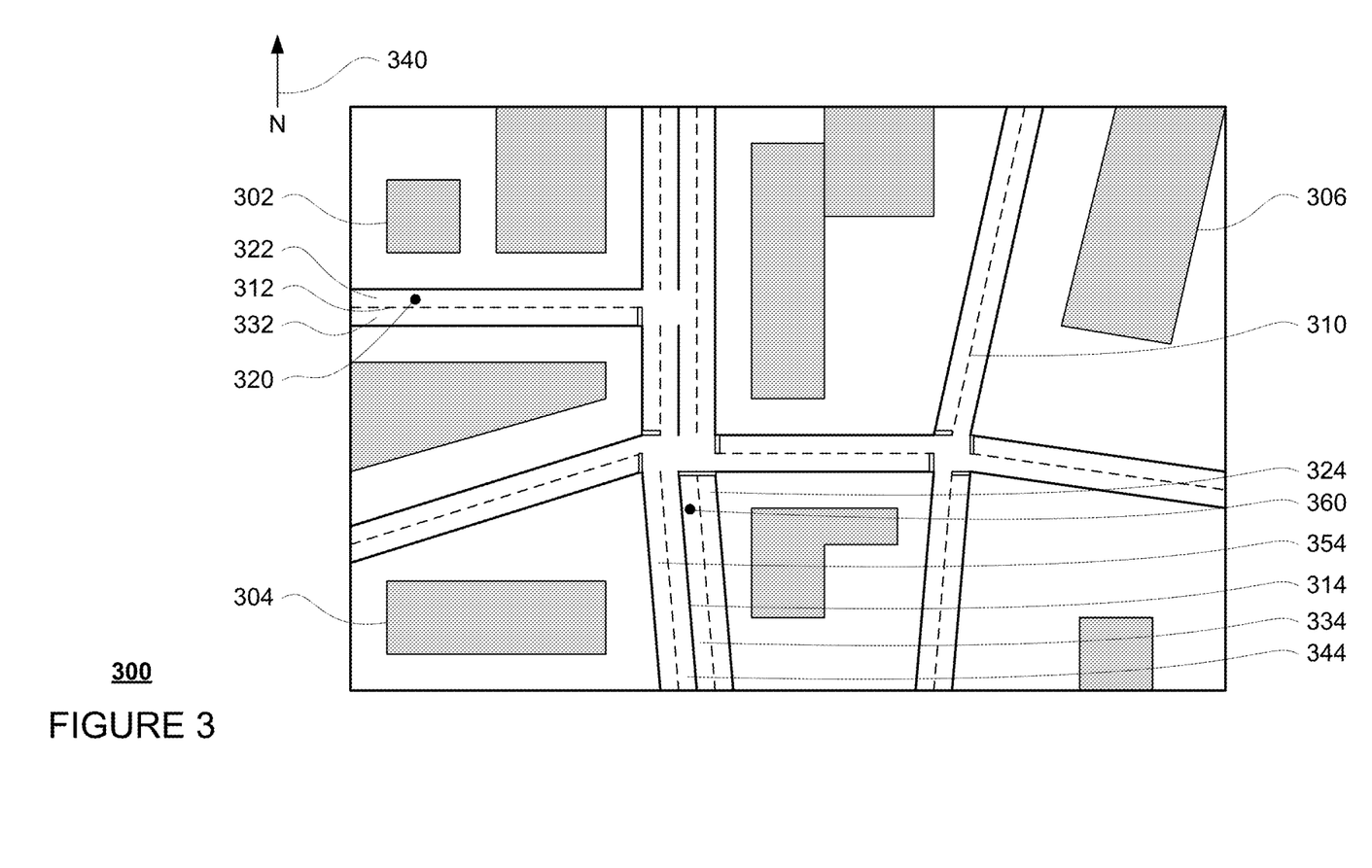
FIG. 3 is an example of detailed map information in accordance with aspects of the disclosure.

The storage system 150 may also store detailed map information describing the shape, lanes, orientations, and other characteristics of roadways. For example, FIG. 3 is an example of map information 300 including a plurality of buildings 302-06 as well roadways 310-14. Some or all of these roadways may be associated with information that identifies the location, shape, orientation, and direction of lanes. As an example, roadway 312 includes lanes 322 and 332 and roadway 314 includes lanes 324, 334, 344, and 354.

In some instances, this detailed information may include a roadgraph having a precomputed index of "lane neighbors." For example, each lane identified in the detailed map information may be associated with information about any neighboring lanes in the roadgraph. This also allows for traversing the detailed map information without having to do more expensive calculations to identify neighboring points. In one instance, the index may identify lanes 322 and 332 of roadway 312 as neighboring lanes. In another example, the index may identify lanes 324, 334, 344, and 354 as neighboring lanes.

With this information, for any given point in a lane, the detailed map information may be used to readily identify the neighboring lanes and the orientations of any such neighboring lanes. Using the example of point 320 in lane 312, traffic in lane 322 flows west relative to the direction indicator 340 of the map. The lane neighbor of lane 322 in the index is lane 332. Traffic in lane 332 flows east. Thus, the neighboring lane of point 320 is lane 332 which flows in the opposite direction of lane 322 in which point 320 is located. In another example, point 360 is in lane 334 where traffic flows north, north west. The lane neighbors of lane 334 in the index are lanes 324, 344, and 354. Traffic in lane 324 flows north, north west, the same direction as in lane 334, and traffic in lanes 344 and 354 flows south, south east, or the opposite direction as in lane 334. In this regard, the neighboring lanes of point 360 are lane 324 in the same direction of lane 334 and lanes 344 and 354 in the opposite direction of lane 334. Although cardinal directions are used in the examples above for simplicity, the actual orientation scale (radians, degrees, etc.) may depend upon how the orientation of the detailed map information is defined.

The detailed map information may also include a number of points (not shown for clarify) identifying predetermined locations where an autonomous vehicle can park, stop and wait, load and unload passengers, etc. The predetermined locations may be manually selected or identified based on characteristics of such locations (sizes, shapes, parking and other laws, etc.) and, in some cases, manually verified. These predetermined locations may thus include reasonable locations where a vehicle could stop selected manually or through some analysis of the characteristics of each location. The predetermined locations may also be limited to locations within a service area of the autonomous vehicle service.

As with memory 104, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIGS. 1 and 2 and/or may be directly connected to or incorporated into any of the computing devices 110, 120, 130, 140, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a preferred location, a preferred destination location, and, in some cases, one or more preferred intermediate stopping locations anywhere within a service area where a vehicle can stop.

Figure 4A:
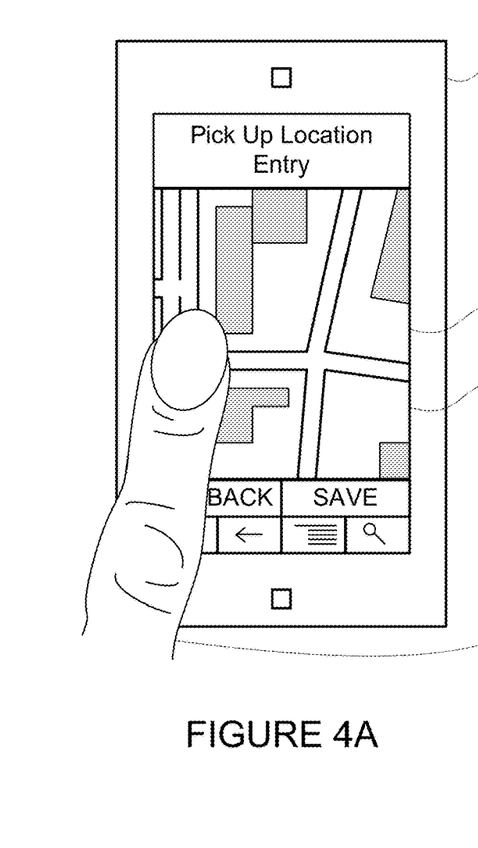
FIGS. 4A, 4B, and 4C are example client devices and screen shots in accordance with aspects of the disclosure.
Figure 4B:
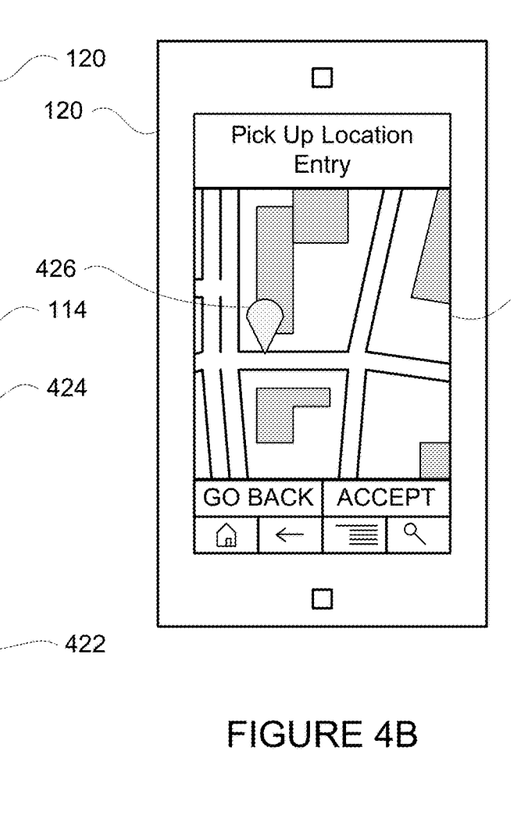

These preferred pickup and/or destination locations may be predefined (e.g., specific areas of a parking lot, etc.) or may simply be any location within a service area of the vehicles. As an example, a preferred location can be defaulted to current location of the user's client computing device, or can be input by the user on the user's client device. For instance, the user may enter an address or other location information or select a location on a map to select a preferred location for a pick up or drop off. As shown in FIG. 4A, user 122 may use his or her finger 422 to tap on a map 424 displayed on the display 114 of client computing device 120. In response, as shown in FIG. 4B, the location of the tap on the map, displayed as map marker 426, may be identified as a preferred location. Allowing the user to input or select a location may be especially helpful where the user is not currently located at the pickup location but will be by the time the vehicle arrives.

Figure 4C:
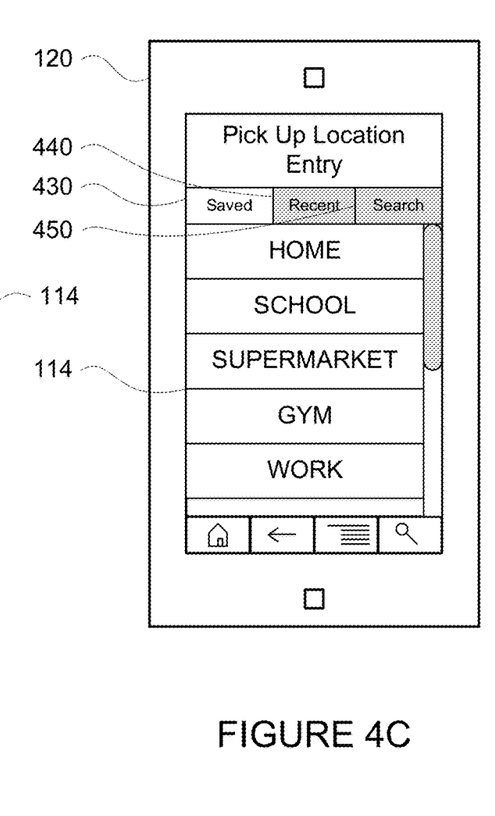

In the example of FIG. 4C, a user is provided with a plurality of options for inputting locations. As shown, the user is able to select from a series of saved locations under a saved option 430 previously saved by the user as discussed above. The user may also be provided with option 440 which provides the user with the ability to view a list of recent locations. By selecting option 450, the user may be able to conduct a location search. For example, a user may enter a search query ("fast food restaurant" or "doctor doe" or "gas station near me") and receive a set of locations corresponding to the search query as with a typical map or location-based search engine. Any of these locations may be selected as a preferred pick up or drop off location.

The preferred pickup and/or drop off locations may then be used to identify a plurality of possible locations. In one example, the preferred locations may be forwarded directly to a vehicle to identify a plurality of possible locations. Alternatively, identification of the plurality of possible locations may be performed by a dispatching server computing system, such as server computing devices 110, which acts as an intermediary between a passenger and the vehicle. In yet another alternative, the preferred locations may be simply provided by the dispatching server computing system without initial input from a user. In response to receiving the preferred location, if it is a pickup location, and more than one vehicle is involved, the server computing devices 110 may select a vehicle, for instance based on availability and proximity to the user.

To identify plurality of possible locations, a series of heuristics for discovering or selecting points of the predetermined locations where an autonomous vehicle can park, stop and wait, load and unload passengers, etc. may be used. These heuristics may include identifying one or more points on the opposite side of the street as the preferred location using the precomputed index of lane-neighbors. Another heuristic may include searching for points within the roadgraph that are close to (or co-located with) the preferred location. A further heuristic may include locating points that are within a predetermined, or in some cases user-specified, distance (e.g. a radial distance) of the preferred location. As an example, a user may specify how far he or she is willing to walk. Thus, the plurality of possible locations may include the preferred location as well as any other point identified using any of the heuristics discussed above.

Figure 5:
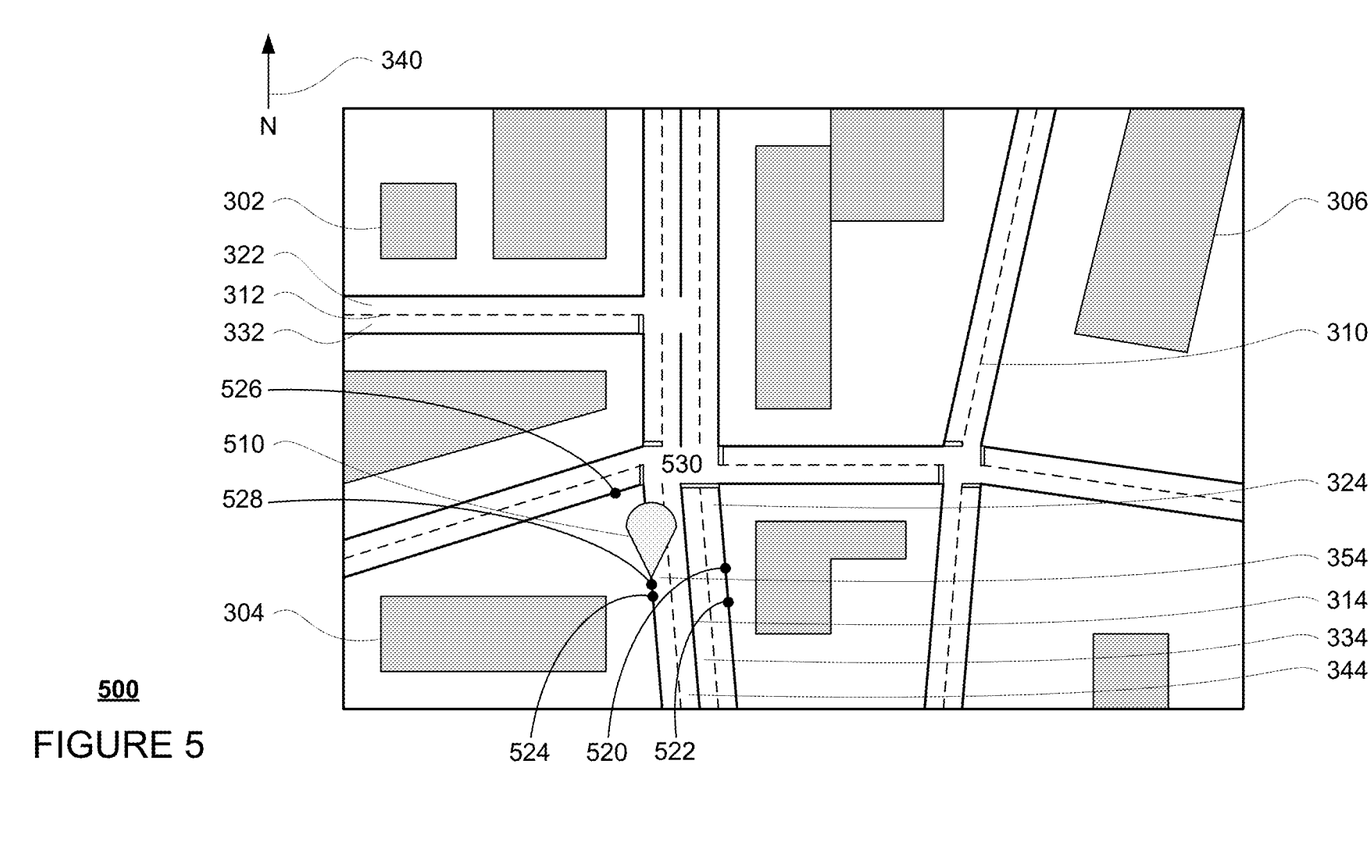
FIG. 5 is an example of detailed map information, a preferred location, and possible locations in accordance with aspects of the disclosure.

For instance, example 500 of FIG. 5 depicts a preferred location 510 provided by a user. Points 520, 522, 524, 526, and 528 represent a plurality of possible locations. As noted above, these points may correspond to predetermined places for the vehicle to stop, wait, park, etc. pre-stored in the detailed map information as discussed above, or newly identified points identified using at least some of the heuristics described above. Although only a few points are used for simplicity in this example, many additional points may also be used. Point 510 is directly adjacent two (and may even be within) lane 354. Points 520 and 522 may be identified using the index. In this example, lanes 344, 334, and 324 are all lane neighbors of lane 354 and also preferred location 510. Because lanes 334 and 344 are between two other lanes (lane 324 and 354), there would be no points identified for a possible location. However, lane 324 is not between two lanes. Thus, points 520 and 522 along lane 324 but away from lane 344 may be identified as possible points for the plurality of possible points.

In addition, point 524 may be identified as a possible location as it is the closest available location to the preferred location 510. Similarly, points any of points 520, 522, 524, 526, and 528 may be located within a predetermined distance of preferred location 510. In this example, the predetermined distance may be selected based on user preference to avoid walking more than 25 meters.

The identified plurality of possible locations may then be filtered. For example, in order to avoid having points that may appear to be very close to one another, but are in reality (or rather topographically) are so close as to be considered the same point, the points may be required to be at least some small distance, such as a few meters or more or less) from their closest neighbor point of the plurality of possible locations. In this regard, point 528 may be filtered. In another example, user preferences may be used as a filter, such as where a user may not want to cross any streets. This can be especially beneficial for a handicapped person or a passenger with small children. In this regard, points 520 and 522 may be filtered. In other examples, "bad points" may be filtered using the detailed map information, such as where a point is in a no parking zone or would block a fire hydrant. In this regard, point 526 may be located in a no parking zone (as it is so close to intersection 530).

The remaining plurality of possible locations may then be analyzed. For instance, an algorithm, such as a modified D* lite search, that supports searching for routes to an arbitrary number of destination points rather than the traditional single one may be used. The searching may include using the current location of a vehicle, that will be or has been dispatched to a preferred pickup location or preferred drop off location, and identifying a fastest route in time or distance to each point.

Using the determined fastest routes, each point may be assigned a cost for the vehicle to reach a given point from its current location. For instance, a cost for a given point may be determined from the distance or time of the route to that point. For instance, as shown in example 600 of FIG. 6, even though vehicle 100 is currently closer to point 526 than point 524, the cost of vehicle 100 traveling from its current location to point 526 may be higher than the cost of vehicle 100 traveling to point 524. This may be because point 524 would require vehicle 100 to make a U-turn or a few extra turns to reach. Thus, even though the physical distance is shorter, the fastest route to point 526 is longer than the fastest route to point 524.

Figure 6:
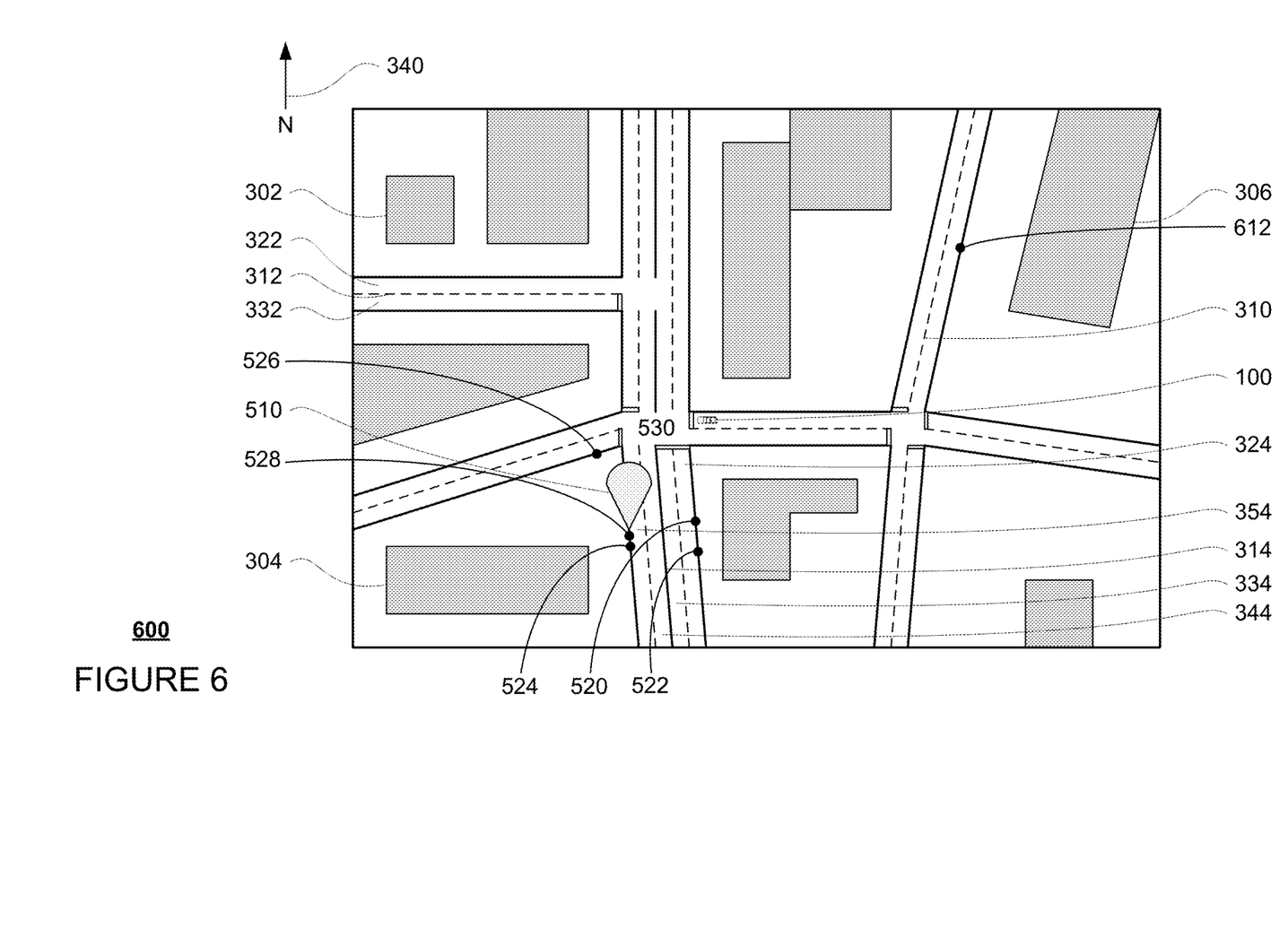
FIG. 6 is an example scenario in accordance with aspects of the disclosure.

The cost may also include valuing the route based on its location relative to a particular destination. In this regard, if the preferred location 510 is a pickup location, and the next destination of the user or cargo corresponds to point 612, the cost of vehicle 100 traveling to point 524 may be lower than the cost of the vehicle traveling to point 526 because the vehicle would be better oriented to reach point 612 faster.

In a further instance, the cost may include whether reaching the point would require difficult maneuvers such as a U-turn. Again, even though vehicle 100 is currently closer to point 526 than point 524, the cost of vehicle 100 traveling from its current location to point 526 may be higher than the cost of vehicle 100 traveling to point 524. This may be because point 524 would require vehicle 100 to make a U-turn or a few extra turns to reach. Thus, even though the physical distance is shorter, the fastest route to point 526 is longer than the fastest route to point 524.

Once the costs of such points have been identified, the lowest costing point or points may be provided to the user. In this regard, the user may be provided with a single point, a fixed number of points as possible locations or a user provided number of points. In this regard, points with higher costs may be excluded. Alternatively, costs may be arranged on a decreasing scale such that lower costing points are excluded, etc.

In most examples, it may be useful to the user if he or she is simply provided with the best, lowest cost option. In some instances, the user may be prompted to provide specific information in order to determine how to value the cost of a particular point such as where the point would save at least some threshold amount of time. For example, some points may have a higher cost because they are farther in distance from the preferred location (or in some cases, the current location of the user's client computing device), but may have a significantly lower cost in time as they are easier to reach by the vehicle. In this regard, the user may be asked whether he or she is amenable to walking a certain distance to be picked up sooner. In example 700 of FIG. 7, it may be less costly for vehicle 100 to reach point 526 than to reach point 524, yet point 526 requires that the user walk much farther from the preferred location than point 524. Thus, the user may be prompted to ask whether the user is willing to do this to reach the vehicle 100.

In another example, a point may have a higher cost because it requires crossing a roadway, but again may have a significantly lower cost in time as they are easier to reach by the vehicle. In this regard, the user may be asked whether he or she is amenable to crossing the roadway. Thus, the user may have a final "say" in how the points are analyzed and which are presented. Turning to example 800 of FIG. 8, it may be less costly for vehicle 100 to reach point 522 than to reach point 524, yet it requires the user to cross over roadway 314. Thus, the user may be prompted to ask whether the user is willing to do this to reach the vehicle 100.

Figure 7:
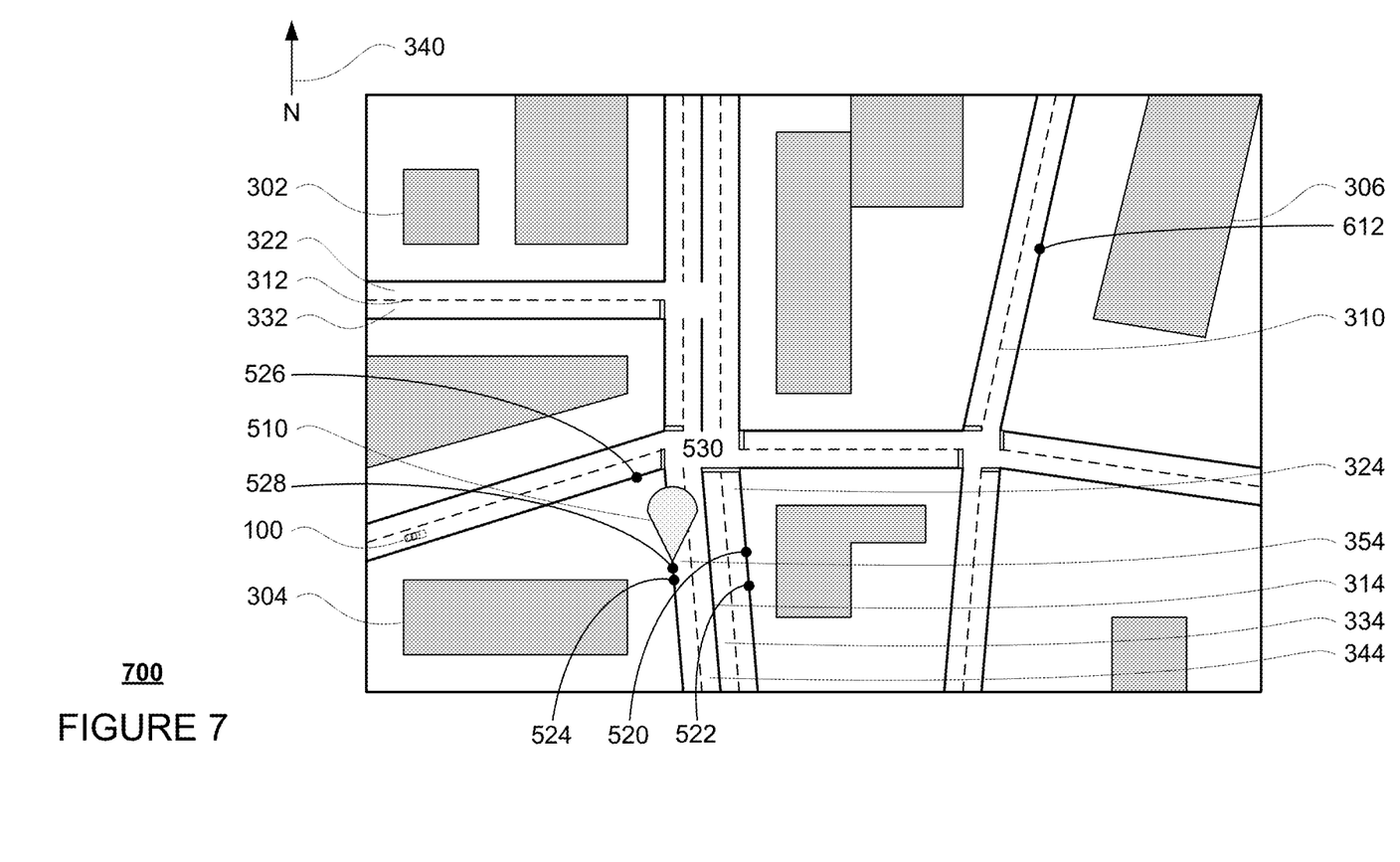
FIG. 7 is another example scenario in accordance with aspects of the disclosure.
Figure 8:
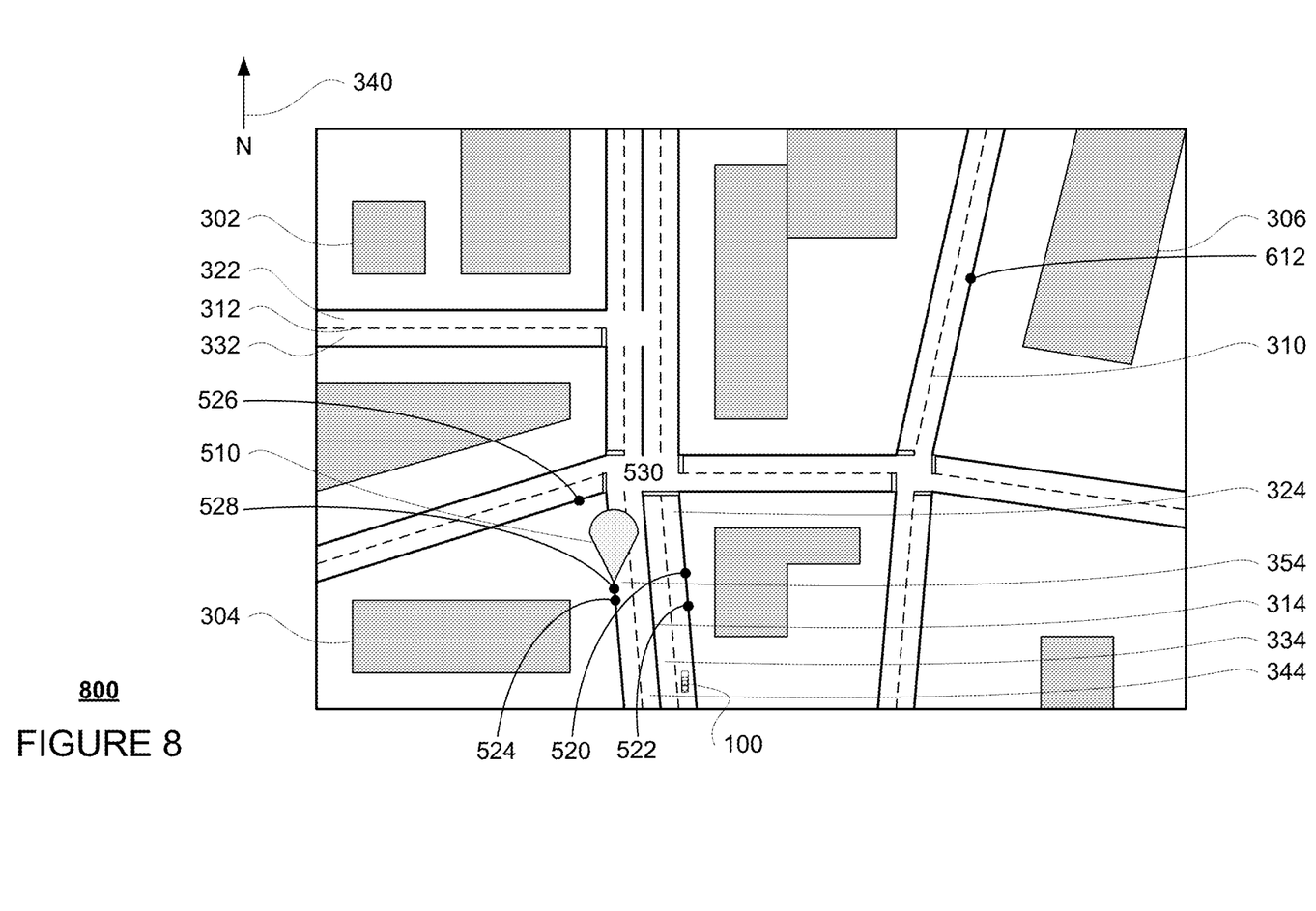
FIG. 8 is a further example scenario in accordance with aspects of the disclosure.

As noted above, rather than using the preferred location as the reference point for determining costs related to the user moving towards a particular point, a current location of the user, provided by the user's client computing device 120, may be used. This, information may be relevant to the examples 700 and 800 discussed above.

The point or points may be provided to the user in various ways which may allow for further refinement. For instance, a map may be displayed with a map pin or other icon identifying each of the points. The user may then select one of the points or may adjust a point, such as by relocating a map pin.

Once the user has approved a particular point for a drop off or pick up location, the client computing device 120 may send the location of the particular point to the server computing devices 110. In response, if the approved point is to be a pickup location, the one or more server computing devices may select a vehicle (if it has not already done so), for instance based on availability and proximity to the pickup location. The server computing device may then dispatch the selected vehicle to pick up to the user or cargo by providing the vehicle with the pickup and/or destination locations specified by the user.

In one alternative, rather than using a pre-computed index of neighboring lanes, a spatial index could be used to query for these points. However, this would likely be much less efficient in dense road networks. In yet another alternative, a brute-force search of the nearby geography in the detailed map information may be used in order to discover any nearby potential points which would likely be less efficient. These approaches could also be used to identifying points within a particular distance of a preferred location.

In another alternative, rather than searching for routes to the points at once, the search for routes for each destination may be done separately. This could be done once at the start of the route at which point a decision could be made and alternative destinations could be filtered. However, this approach limits the ability to dynamically change pickup locations. Alternatively, this could be done continuously as the vehicle moves along the route and in parallel. However, this would require tracking a significant amount of information for each destination, which in turn, would require significantly more computing power. If done in sequence, this would still require more computing power, but would reduce the necessary computing power required at any given instant.

Using the features discussed herein, searching of multiple points may be achieved as quickly as a single destination point. This, in turn, allows for the searching to continue as the vehicle moves through the world and the dynamics of the world change in real time to identify even more efficient pick up locations. For instance, although at the start of a trip, the vehicle may be routed to destination A as the most efficient pickup location, as the vehicle progresses and discovers more of the current state of the world, the destination may change to destination B and so on.

Figure 9:
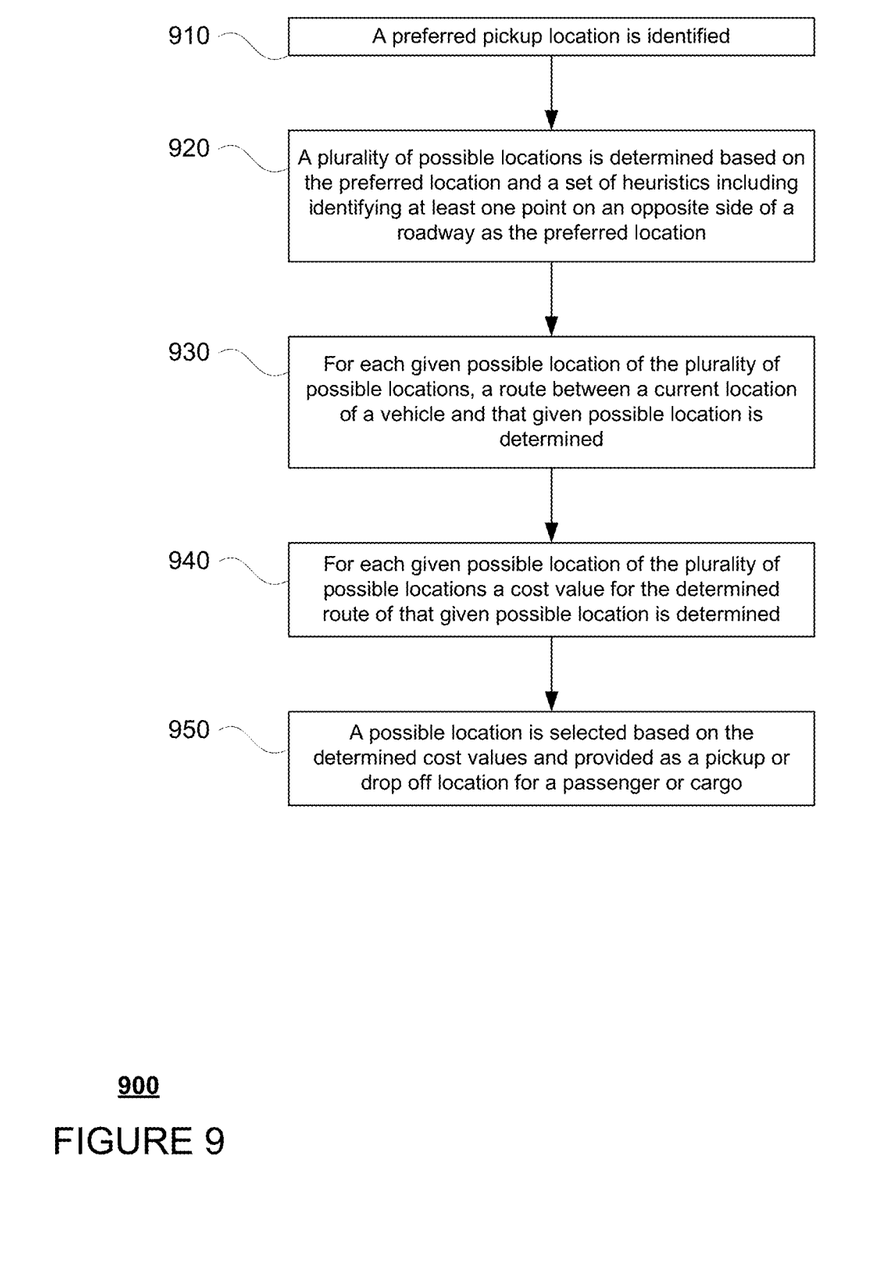
FIG. 9 is an example flow diagram in accordance with aspects of the disclosure.

FIG. 9 is an example flow diagram 900 in accordance with some of the aspects described above that may be performed by one or more computing devices such as the one or more server computing devices 110. For example, at block 910, a preferred location is identified. At block 920 a plurality of possible locations is determined based on the preferred location and a set of heuristics including identifying at least one point on an opposite side of a roadway as the preferred location. Next, for each given possible location of the plurality of possible locations, a route between a current location of a vehicle and that given possible location is determined at block 930. For each given possible location of the plurality of possible locations, a cost value for the determined route of that given possible location is determined at block 940. A possible location is selected based on the determined cost values and provided as a pickup or drop off location for a passenger or cargo at block 950.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   identifying, by one or more computing devices having one or more processors, a preferred pickup location for a passenger;
   determining, by the one or more computing devices, a plurality of possible pickup locations based on the preferred pickup location and map information including a pre-computed network of lane neighbors for a lane defined for each of the possible pickup locations, the map information providing a direction of travel for the lane defined for each of the possible pickup locations and a direction of travel for each lane neighbor of the network of lane neighbors;
   determining for each given possible pickup location of the plurality of possible pickup locations, by the one or more computing devices, a route between a current location of a vehicle and that given possible pickup location;
   determining for each given possible pickup location of the plurality of possible pickup locations, by the one or more computing devices, a cost value for the determined route, the cost value being determined according to at least one of a distance between the determined route and each given possible pickup location, a time from the determined route to each given possible pickup location, or whether reaching each given possible pickup location from the determined route would require the vehicle to perform a particular driving maneuver;
   selecting one of the plurality of possible pickup locations, by the one or more computing devices, based on the determined cost values;
   providing, by the one or more computing devices, the selected possible pickup location as a pickup location for the passenger; and
   dispatching, by the one or more computing devices, the vehicle to pick up the passenger by sending an instruction to the vehicle to cause the vehicle to autonomously maneuver towards the provided pickup location to pick up the passenger.

2. The method of claim 1, wherein determining the plurality of possible locations further includes identifying at least one location that is within a predetermined distance of the preferred location.

3. The method of claim 1, wherein determining the plurality of possible locations further includes identifying at least one location using the pre-computed network of lane neighbors.

4. The method of claim 1, further comprising, prior to determining the determined routes, filtering the plurality of possible locations based on distances between possible locations of the plurality of possible locations.

5. The method of claim 1, further comprising, prior to determining the determined routes, filtering the plurality of possible locations based on a user preference for crossing a roadway.

6. The method of claim 1, further comprising, prior to determining the determined routes, filtering the plurality of possible locations based on where the point is located in a no parking zone.

7. The method of claim 1, further comprising, prior to determining the determined routes, filtering the plurality of possible locations based on where the point is located relative to a fire hydrant.

8. The method of claim 1, wherein the cost value is determined according to the distance between the determined route and each given possible pickup location, the distance indicating a spatial relationship between the particular possible pickup location and a destination location for the vehicle after the passenger has been picked up.

9. The method of claim 1, wherein the cost value is determined according to whether reaching each given possible pickup location from the determined route would require the vehicle to perform the particular driving maneuver, the particular driving maneuver including making a U-turn.

10. A system comprising:
    one or more server computers each having one or more processors, the one or more server computers being configured to:
    identify a preferred pickup location for a passenger;
    determine a plurality of possible pickup locations based on the preferred pickup location and map information including a pre-computed network of lane neighbors for a lane defined for each of the possible pickup locations, the map information providing a direction of travel for the lane defined for each of the possible pickup locations and a direction of travel for each lane neighbor of the network of lane neighbors;
    determine for each given possible pickup location of the plurality of possible pickup locations a route between a current location of a vehicle and that given possible pickup location;
    determine for each given possible pickup location of the plurality of possible pickup locations a cost value for the determined route, the cost value being determined according to at least one of a distance between the determined route and each given possible pickup location, a time from the determined route to each given possible pickup location, or whether reaching each given possible pickup location from the determined route would require the vehicle to perform a particular driving maneuver;

select one of the plurality of possible pickup locations based on the determined cost values;

provide the selected possible pickup location as a pickup location for the passenger; and dispatch the vehicle to pick up the passenger by sending an instruction to the vehicle to cause the vehicle to autonomously maneuver towards the provided pickup location to pick up the passenger.

11. The system of claim 10, wherein the one or more computing devices are further configured to determine the plurality of possible locations further by identifying at least one location that is within a predetermined distance of the preferred location.

12. The system of claim 10, wherein the one or more computing devices are further configured to determine the plurality of possible locations further by identifying at least one location using the pre-computed network of lane neighbors.

13. The system of claim 10, wherein the one or more computing devices are further configured to, prior to determining the determined routes, filter the plurality of possible locations based on distances between possible locations of the plurality of possible locations.

14. The system of claim 10, wherein the one or more computing devices are further configured to, prior to determining the determined routes, filter the plurality of possible locations based on a user preference for crossing a roadway.

15. The system of claim 10, wherein the one or more computing devices are further configured to, prior to determining the determined routes, filter the plurality of possible locations based on where the point is located in a no parking zone.

16. The system of claim 10, wherein the one or more computing devices are further configured to, prior to determining the determined routes, filter the plurality of possible locations based on where the point is located relative to a fire hydrant.

17. The system of claim 10, wherein the one or more computing devices are further configured to determine the cost value according to the distance between the determined route and each given possible pickup location, the distance indicating a spatial relationship between the particular possible pickup location and a destination location for the vehicle after the passenger has been picked up.

18. The system of claim 10, wherein the one or more computing devices are further configured to determine the cost value according to whether the determined route would require the vehicle to perform the particular driving maneuver, the particular driving maneuver including making a U-turn.

19. The system of claim 10, further comprising the vehicle.

20. A non-transitory, tangible, computer readable medium on which instructions are stored, the instructions, when executed by one or more processors, cause the one or more processors to perform a method, the method comprising:

identifying a preferred pickup location for a passenger;

determining a plurality of possible pickup locations based on the preferred pickup location and map information including a pre-computed network of lane neighbors for a lane defined for each of the possible pickup locations, the map information providing a direction of travel for the lane defined for each of the possible pickup locations and a direction of travel for each lane neighbor of the network of lane neighbors;

determining for each given possible pickup location of the plurality of possible pickup locations a route between a current location of a vehicle and that given possible pickup location;

determining for each given possible pickup location of the plurality of possible pickup locations a cost value for the determined route, the cost value being determined according to at least one of a distance between the determined route and each given possible pickup location, a time from the determined route to each given possible pickup location, or whether reaching each given possible pickup location from the determined route would require the vehicle to perform a particular driving maneuver;

selecting one of the plurality of possible pickup locations based on the determined cost values;

providing the selected possible pickup location as a pickup location for the passenger; and dispatch the vehicle to pick up the passenger by sending an instruction to the vehicle to cause the vehicle to autonomously maneuver towards the provided pickup location to pick up the passenger.

* * * * *

UNITED STATES PATENT AND TRADEMARK OFFICE
CERTIFICATE OF CORRECTION

| | | |
|---|---|---|
| PATENT NO. | : 10,545,023 B1 | Page 1 of 1 |
| APPLICATION NO. | : 14/948754 | |
| DATED | : January 28, 2020 | |
| INVENTOR(S) | : Joshua Seth Herbach and Nathaniel Fairfield | |

It is certified that error appears in the above-identified patent and that said Letters Patent is hereby corrected as shown below:

In the Claims

Claim 6
Column 14, Line 23:
Now reads: "where the point is located"; should read -- where a point is located --

Claim 7
Column 14, Line 27:
Now reads: "where the point is located"; should read -- where a point is located --

Claim 8
Column 14, Lines 32-33:
Now reads: "between the particular possible"; should read -- between the given possible --

Claim 15
Column 15, Line 31:
Now reads: "where the point is located"; should read -- where a point is located --

Claim 16
Column 15, Line 36:
Now reads: "where the point is located"; should read -- where a point is located --

Claim 17
Column 15, Line 42:
Now reads: "between the particular possible"; should read -- between the given possible --

Signed and Sealed this
Twenty-first Day of April, 2020

Andrei Iancu
*Director of the United States Patent and Trademark Office*